(12) United States Patent
Kobayashi et al.

(10) Patent No.: US 9,454,159 B2
(45) Date of Patent: Sep. 27, 2016

(54) PRESSURE REGULATING VALVE

(71) Applicants: Masahiro Kobayashi, Toyohashi (JP); Katsuyuki Hata, Nagoya (JP); Takanori Taga, Nagoya (JP)

(72) Inventors: Masahiro Kobayashi, Toyohashi (JP); Katsuyuki Hata, Nagoya (JP); Takanori Taga, Nagoya (JP)

(73) Assignee: Aisan Kogyo Kabushiki Kaisha, Aichi-ken (JP)

(*) Notice: Subject to any disclaimer, the term of this patent is extended or adjusted under 35 U.S.C. 154(b) by 97 days.

(21) Appl. No.: 14/466,602

(22) Filed: Aug. 22, 2014

(65) Prior Publication Data

US 2015/0059878 A1    Mar. 5, 2015

(30) Foreign Application Priority Data

Aug. 27, 2013 (JP) ................. 2013-175702

(51) Int. Cl.
G05D 16/20    (2006.01)
F02M 63/00    (2006.01)
F16K 31/06    (2006.01)
(Continued)

(52) U.S. Cl.
CPC ........ G05D 16/2006 (2013.01); F02M 21/023 (2013.01); F02M 63/0068 (2013.01); F02M 63/0073 (2013.01); F16K 31/0655 (2013.01); G05D 16/2093 (2013.01); *F16K 1/52* (2013.01); *Y02T 10/32* (2013.01); *Y10T 137/7797* (2015.04); *Y10T 137/87515* (2015.04)

(58) Field of Classification Search
CPC ................ G05D 16/2006; G05D 16/2093; F02M 21/023; F02M 21/0239; F02M 63/0068; F02M 63/0073; Y10T 137/8741; Y10T 137/87418; Y10T 137/87507; Y10T 137/87515

USPC ............ 137/601.15, 601.01, 601.02, 601.14
See application file for complete search history.

(56) References Cited

U.S. PATENT DOCUMENTS 7,497,232 B2   3/2009  Müller et al.
7,575,020 B2   8/2009  Pechtold
(Continued)

FOREIGN PATENT DOCUMENTS

DE    102004020268 A1    11/2005
DE    102007039925 A1     4/2008
(Continued)

OTHER PUBLICATIONS

German Office Action for Application No. 10 2014 111 933.9, mailed Jun. 29, 2015; English language translation included; 15 pages total.

*Primary Examiner* — Mary McManmon
*Assistant Examiner* — Richard K Durden
(74) *Attorney, Agent, or Firm* — Patterson Thuente Pedersen, P.A.

(57) ABSTRACT

A pressure regulating valve includes a device body and an actuator. The device body includes a valve seat member, a valve, which is capable of closing the first opening of the valve seat member, an urging member, which urges the valve toward the valve seat member, a piston arranged opposite to the valve across the valve seat member, an actuator, which adjusts the position of the piston, and a protrusion provided on at least one of the piston and the valve. When the tip end of the protrusion comes into contact with the piston or the valve, the second opening of the second fluid passage is closed. When the tip end of the protrusion is not in contact with any of the piston and the valve and the second opening is opened, the second fluid passage is in communication with the pressure regulation chamber.

5 Claims, 6 Drawing Sheets

(51) Int. Cl.
*F02M 21/02* (2006.01)
*F16K 1/52* (2006.01)

(56) References Cited

U.S. PATENT DOCUMENTS

2006/0016492 A1 1/2006 Muller et al.
2008/0047619 A1 2/2008 Pechtold

FOREIGN PATENT DOCUMENTS

| | | |
|---|---|---|
| JP | 2009-53962 | 3/2009 |
| JP | 2010-515993 | 5/2010 |
| JP | 2012-73886 | 4/2012 |
| WO | WO2008/087511 | 7/2008 |

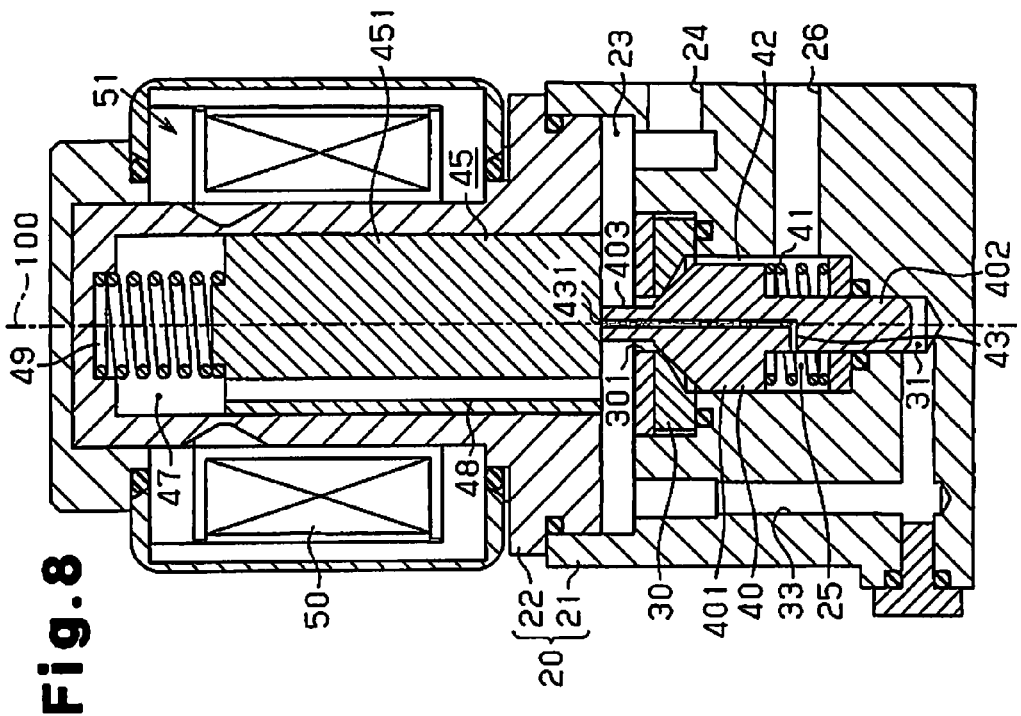
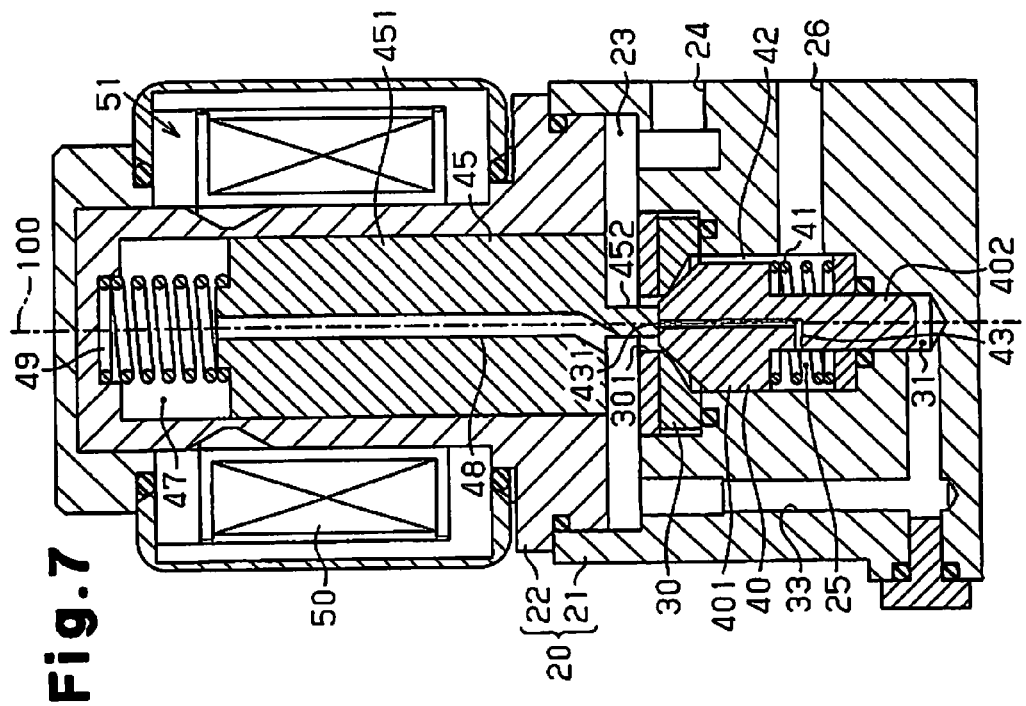

PRESSURE REGULATING VALVE

RELATED APPLICATIONS

This application claims the benefit of Japanese Patent Application No. 2013-175702, filed Aug. 27, 2013, said application being fully incorporated herein by reference.

FIELD OF THE INVENTION

The present invention relates to a pressure regulating valve that reduces the pressure of fluid.

BACKGROUND OF THE INVENTION

Convetionally, a pressure regulating valve is provided in a supply system that supplies fluid, which is gaseous fuel for example, to an internal combustion engine. The pressure regulating valve storage reduces the pressure of the gaseous fuel from a high tank pressure to a specified pressure and supplies the gaseous fuel with the reduced pressure to a fuel injection valve, as described in Japanese Laid-Open Patent Publication No. 2012-73886.

The pressure regulating valve disclosed in Japanese Laid-Open Patent Publication No. 2012-73886 includes a valve chamber in communication with an inflow portion, into which the gaseous fuel flows, and a pressure regulation chamber in communication with an outflow portion, which discharges the gaseous fuel. The pressure regulating valve includes a valve seat member, which separates the valve chamber and the pressure regulation chamber from each other. The pressure regulating valve further includes a valve arranged in the valve chamber and an urging member. The valve relatively moves toward or away from the valve seat member. The urging member applies an urging force to the valve in a direction toward the valve seat member. The valve includes a protrusion, which protrudes to the pressure regulation chamber through an opening formed in the valve seat member.

The pressure regulating valve includes a piston formed from magnetic material and an electromagnetic actuator. The piston separates the pressure regulation chamber and a back pressure chamber from each other. The electromagnetic actuator drives the piston to move in the direction toward or away from the valve seat member. The piston contacts the tip end of the protrusion of the valve. The force by which the piston pushes the valve is adjusted according to the driving state of the actuator.

Specifically, when the amount of injection of fuel through the fuel injection valve is small and the set pressure in a delivery pipe, which temporarily stores gaseous fuel to be supplied to the injection valve, is set comparatively low during the idling operation, for example, current is not supplied to the actuator. This reduces the force by which the piston pushes the valve, so that the opening degree of the opening in the valve seat member is unlikely to be increased. In contrast, when the amount of injection of fuel through the fuel injection valve is great and the set pressure in the delivery pipe is set comparatively high, current is supplied to the actuator. This increases the force by which the piston pushes the valve, so that the opening degree of the opening in the valve seat member is likely to be increased.

In the case of the above pressure regulating valve, the valve is moved in the direction away from the valve seat member against the urging froce by the urging member to increase the opening degree of the opening in the valve seat member. Accordingly, the urging force by the urging member is reduced so that the valve is easily moved in the direction away from the valve seat member. In this case, when a large amount of gaseous fuel needs to flow from the valve chamber into the pressure regulation chamber such as when the set pressure is high or when the fluid pressure in the storage tank is low and the fluid pressure in the valve chamber is low, the opening degree of the opening is likely to be increased. In this case, the fluid pressure in the pressure regulation chamber, i.e., the fluid pressure downstream from the pressure regulating valve is regulated with high accuracy.

In contrast, when the flow rate of gaseous fuel from the valve chamber into the pressure regulation chamber needs to be reduced such as when the set pressure is low or when the fluid pressure in the storage tank is high and the fluid pressure in the valve chamber is high, fine adjustment of the opening degree of the opening is hard to be performed. This leads to reduction of the regulation performance of the fluid pressure in the pressure regulation chamber.

On the other hand, if the urging force by the urging member is increased, the fine adjustment of the opening degree of the opening is easily performed. Accordingly, when the flow rate of gaseous fuel from the valve chamber into the pressure regulation chamber needs to be reduced as described above, the fluid pressure in the pressure regulation chamber is regulated with high accuracy. In contrast, when a large amount of the gaseous fuel needs to flow from the valve chamber into the pressure regulation chamber as described above, the opening degree of the opening is unlikely to be increased. In this case, this leads to reduction of the regulation performance of the fluid pressure in the pressure regulation chamber.

SUMMARY OF THE INVENTION

An objective of the present invention is to provide a pressure regulating valve that limits variation in the adjustment accuracy of the fluid pressure in the pressure regulation chamber. To achieve the above described object, according to an aspect of the present invention, a pressure regulating valve including a device body and an actuator is provided. The device body includes an inflow portion into which fluid flows, a valve chamber that is in communication with the inflow portion, an outflow portion out of which the fluid flows, a pressure regulation chamber that is in communication with the outflow portion, a valve seat member, a valve located in the valve chamber, an urging member, and a piston arranged opposite to the valve across the valve seat member. The valve seat member separates the valve chamber and the pressure regulation chamber from each other. The valve is capable of closing a first opening defined by the valve seat member. The urging member applies an urging force to the valve in a direction toward the valve seat member. The actuator adjusts a position of the piston in accordance with a power supply state. A first fluid passage draws the fluid in the valve chamber into the pressure regulation chamber. The first fluid passage is connected with the pressure regulation chamber via the first opening in a state where the valve is separated from the valve seat member. A second fluid passage is provided in the valve. The second fluid passage includes a second opening, has a cross-sectional area that is different from a cross-sectional area of the first fluid passage and draws the fluid in the valve chamber into the pressure regulation chamber. A protrusion is provided on at least one of the piston and the valve. In a case where the protrusion is provided on the piston, the protrusion protrudes toward the valve through the first opening, and when a tip end of the protrusion comes into contact with the valve, the second opening of the second fluid passage is closed. In a case where the protrusion is provided on the valve, the protrusion protrudes toward the piston through the first opening, and when the tip end of the protrusion comes into contact with the piston, the second opening of the second fluid passage is closed. In a case where the protrusion is provided on each of the piston and the valve, the protrusion on the piston protrudes toward the valve through the first opening, the protrusion on the valve protrudes toward the piston through the first opening, and when the tip end of the protrusion on the valve comes into contact with the tip end of the protrusion on the piston, the second opening of the second fluid passage is closed. When the tip end of the protrusion is out of contact with any of the piston and the valve and the second opening is opened, the second fluid passage is in communication with the pressure regulation chamber.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7 is a cross-sectional view schematically illustrating the configuration of a pressure regulating valve according to another embodiment;

FIG. 8 is a cross-sectional view schematically illustrating the configuration of a pressure regulating valve according to yet another embodiment.

DETAILED DESCRIPTION OF THE PREFERRED EMBODIMENTS

Hereinafter, a pressure regulating valve that reduces the fluid pressure according to one embodiment will be described according to FIGS. 1 to 6. The vertical direction in FIG. 1 is referred to as axial direction.

Figure 1:
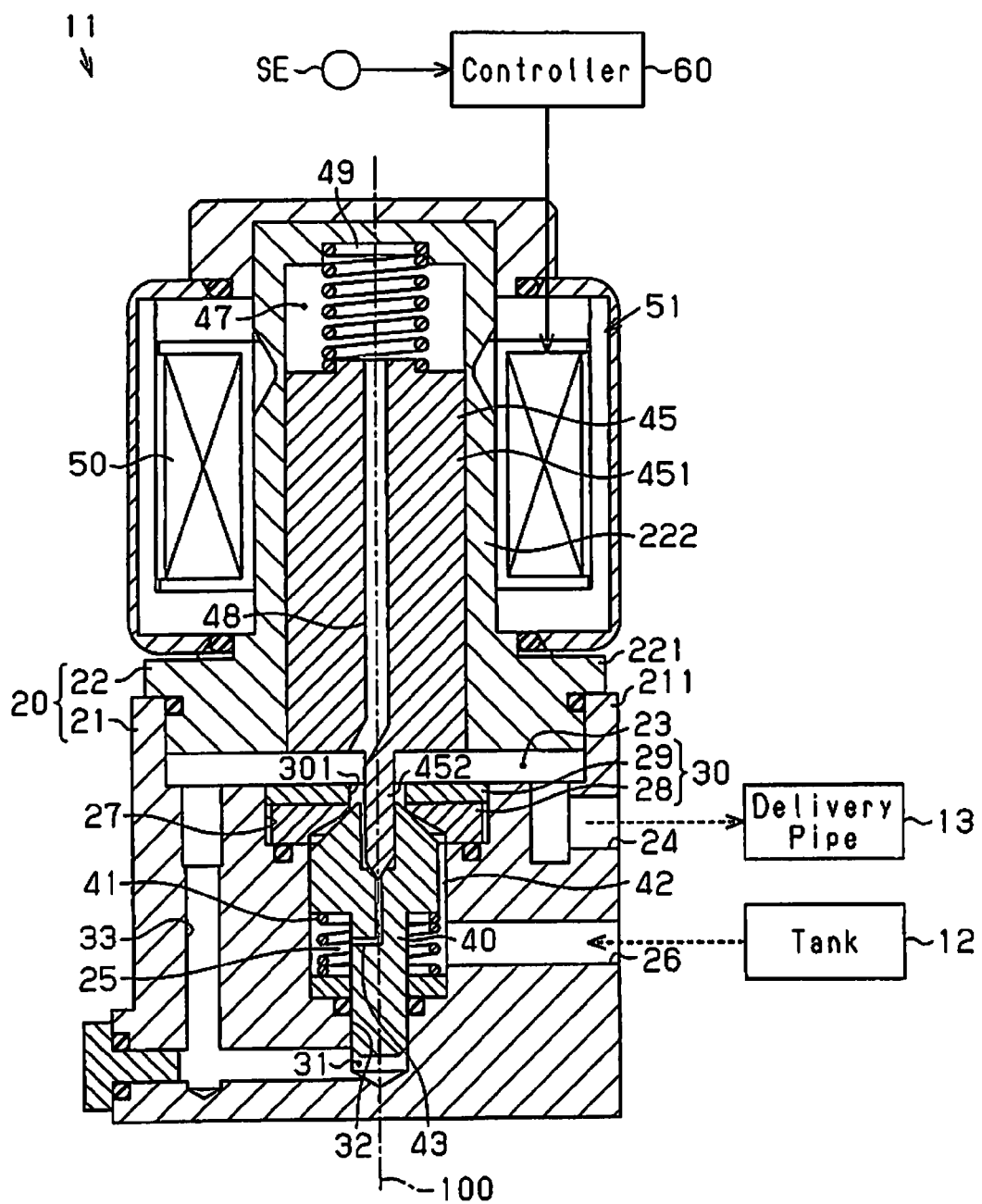
FIG. 1 is a cross-sectional view schematically illustrating the configuration of a pressure regulating valve according to one embodiment.

As shown in FIG. 1, a pressure regulating valve 11 is a valve provided in the supply system for supplying compressed natural gas (CNG), which is an example of fluid, to an internal combustion engine. The pressure regulating valve 11 reduces the pressure of CNG at high pressure supplied from a tank 12 and supplies the CNG into a delivery pipe 13. The CNG that is temporarily stored in the delivery pipe 13 is injected through an injector.

In the internal combustion engine in which the pressure regulating valve 11 according to the present embodiment is provided, the set pressure in the delivery pipe 13 is changed according to the rotation speed of an output shaft. For example, when the output shaft rotates at a high speed such as when the accelerator pedal is operated, the amount of fuel injected through the injector is great. Accordingly, the set pressure is set high. In contrast, when the output shaft rotates at a low speed such as during an idling operation with the accelerator pedal not being operated, the amount of fuel injected through the injector is small. Accordingly, the set pressure is set low.

A device body 20 of the pressure regulating valve 11 includes a first body member 21 located in the lower portion of the device body 20 in FIG. 1 and a second body member 22 located in the upper portion of the device body 20 in FIG. 1. The second body member 22 is substantially cylindrical with a closed end. A flange 221 is provided on an opening end (lower end in FIG. 1) of the second body member 22. Further, the upper portion of the first body member 21 in FIG. 1 includes a tubular portion 211. The flange 221 of the second body member 22 is received in the tubular portion 211 of the first body member 21 to define a pressure regulation chamber 23. The pressure regulation chamber 23 is connected with the delivery pipe 13 by an outflow path 24, which serves as an outflow portion located in the device body 20.

Figure 2:
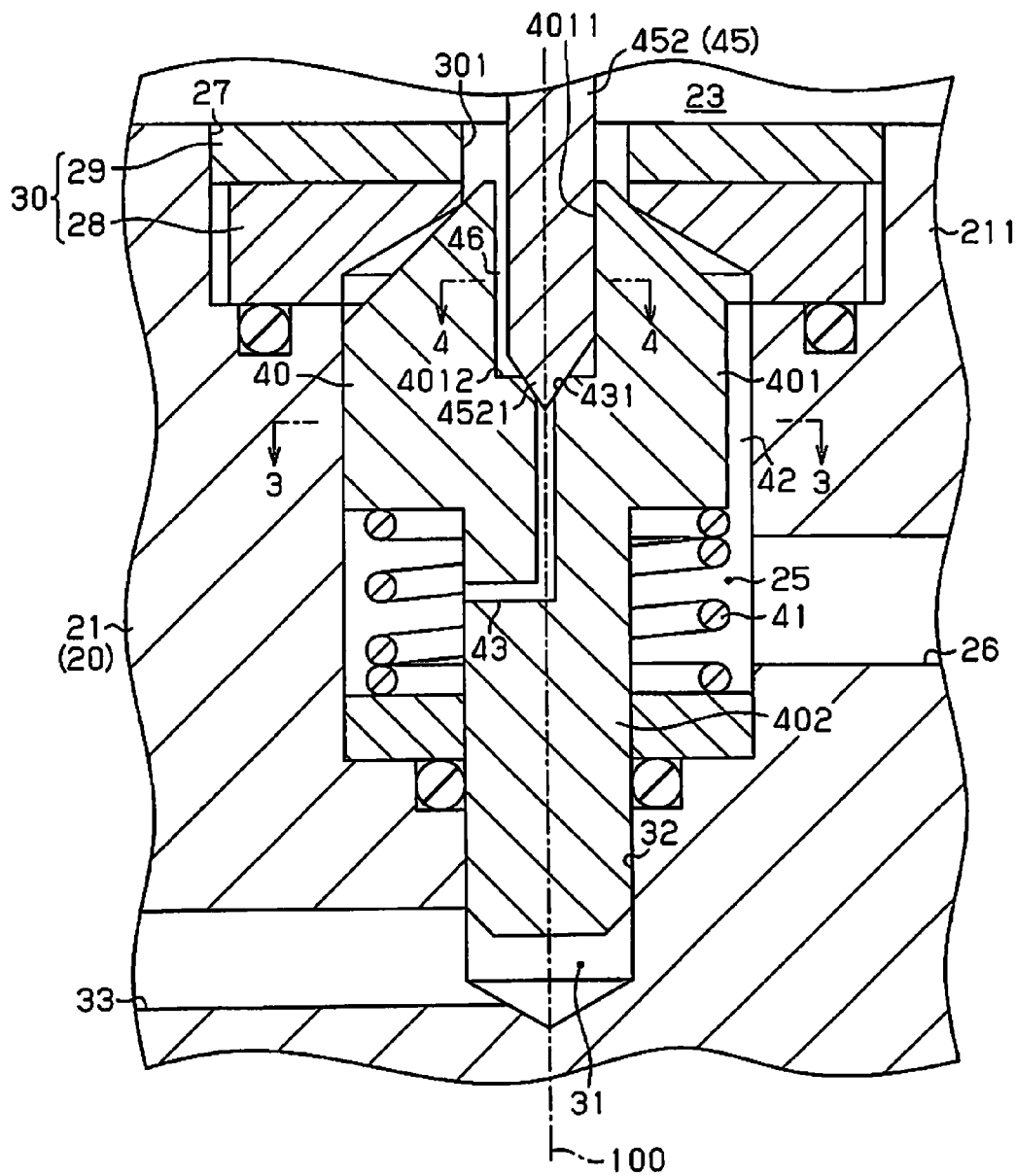
FIG. 2 is a partially enlarged cross-sectional view illustrating the pressure regulating valve.

As shown in FIGS. 1 and 2, the first body member 21 includes a valve chamber 25. The valve chamber 25 is connected with the tank 12 by an inflow path 26, which serves as an inflow portion. The first body member 21 includes an intermediate portion 27 located at a position between the valve chamber 25 and the pressure regulation chamber 23 in the axial direction. The intermediate portion 27 has a diameter greater than the diameter of the valve chamber 25. The intermediate portion 27 accommodates a seat 28 and a plug 29. The seat 28 includes substantially a disk-like shape as viewed in the axial direction. The plug 29 regulates the separation of the seat 28 from the intermediate portion 27. That is, the seat 28 and the plug 29 separate the pressure regulation chamber 23 and the valve chamber 25 from each other. In this regard, the seat 28 and the plug 29 configure an example of a valve seat member 30.

A first opening 301 is formed in the valve seat member 30 to connect the pressure regulation chamber 23 and the valve chamber 25 with each other. The axial center of the first opening 301 coincides with the axis 100, which extends in the axial direction of the pressure regulating valve 11. When the first opening 301 is opened, the CNG in the valve chamber 25 flows through the first opening 301 into the pressure regulation chamber 23.

The first body member 21 also includes a back pressure chamber 31 and a communicating portion 32. The back pressure chamber 31 is located opposite to the pressure regulation chamber 23 across the valve chamber 25, i.e., at a position lower than the position of the valve chamber 25 in FIGS. 1 and 2. The communicating portion 32 connects the valve chamber 25 and the back pressure chamber 31 with each other. The diameter of the communicating portion 32 is the same as the diameter of the first opening 301. The back pressure chamber 31 is connected with the pressure regulation chamber 23 by a back pressure passage 33. Accordingly, the fuel pressure (fluid pressure) in the back pressure chamber 31 is the same as the fuel pressure (fluid pressure) in the pressure regulation chamber 23.

The first body member 21 includes a valve 40, which closes the first opening 301 of the valve seat member 30, and a first spring 41, which serves as an urging member. The first spring 41 applies an urging force to the valve 40 arranged in the valve chamber 25 in the direction toward the valve seat member 30.

The valve 40 can slide along the inner wall of the valve chamber 25 in the axial direction. The valve 40 includes a body 401 located in the valve chamber 25, and a rod-shaped cancelling portion 402, which protrudes from the body 401 toward the communicating portion 32. The upper portion of the body 401 is configured to be tapered toward the upper end. The diameter of the cancelling portion 402 is less than the diameter of the body 401 and also is the same as the diameter of the communicating portion 32. That is, the cancelling portion 402 can slide on the inner wall of the communicating portion 32. The cancelling portion 402 separates the valve chamber 25 and the back pressure chamber 31 from each other.

As described above, the diameter of the communicating portion 32 is the same as the diameter of the first opening 301, and the fuel pressure in the pressure regulation chamber 23 is the same as that in the back pressure chamber 31. Accordingly, the force that pushes the valve 40 downward, i.e., the fuel pressure in the pressure regulation chamber 23 applied to the tip end, i.e., the upper end of the valve 40 in FIGS. 1 and 2, is cancelled by the force that pushes the valve 40 upward, i.e., the fuel pressure in the back pressure chamber 31 applied to the cancelling portion 402.

Figure 3:
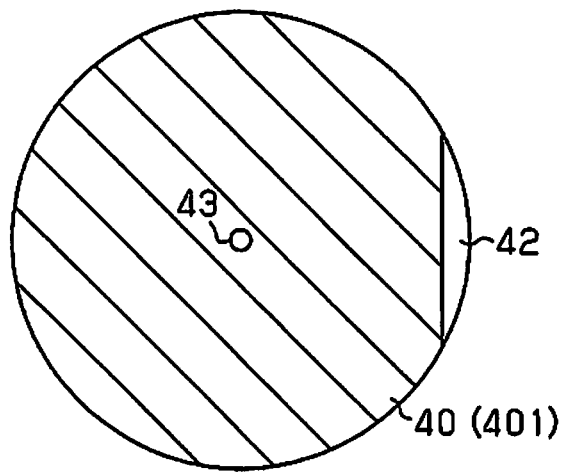
FIG. 3 is a cross-sectional view taken along line 3-3 in FIG. 2.

As shown in FIGS. 2 and 3, a cutout is formed in the side wall of the body 401 of the valve 40 in the upward direction to provide a first fluid passage 42 between the body 401 of the valve 40 and the inner wall of the first body member 21. The first fluid passage 42 draws the CNG in the valve chamber 25 into the pressure regulation chamber 23. When the valve 40 is separated from the valve seat member 30, the first fluid passage 42 is connected with the pressure regulation chamber 23 via the first opening 301. In contrast, when the valve 40 is seated on the valve seat member 30, the first opening 301 is closed by the valve 40. This shuts off the communication between the first fluid passage 42 and the pressure regulation chamber 23.

Further, a guide hole 4011 is formed in the tip end of the body 401 of the valve 40. The valve 40 includes a second fluid passage 43 for drawing the CNG in the valve chamber 25 into the pressure regulation chamber 23 separate from the first fluid passage 42. The cross-sectional area of the second fluid passage 43 is less than the cross-sectional area of the first fluid passage 42. The second fluid passage 43 is opened to the bottom surface 4012 of the guide hole 4011. The opening formed in the bottom surface 4012 is referred to as a second opening 431. The axial center of the second opening 431 corresponds to the axis 100 and is coaxially arranged with the first opening 301. When the second opening 431 is opened, the second fluid passage 43 is in communication with the pressure regulation chamber 23. When the second opening 431 is closed, the communication between the second fluid passage 43 and the pressure regulation chamber 23 is shut off.

As shown in FIG. 1, the pressure regulating valve 11 includes a piston 45 that is coaxially arranged with the valve 40. The piston 45 is also arranged opposite to the valve 40 across the valve seat member 30. The piston 45 is formed from magnetic material and includes a columnar piston body 451 and a protrusion 452, which protrudes downward from the lower end of the piston body 451. The diameter of the piston body 451 is the same as the inner diameter of at tubular portion 222 of the second body member 22, and the piston 45 can slide on the inner wall of the tubular portion 222 of the second body member 22 in the axial direction.

The diameter of the protrusion 452 is less than the diameter of the first opening 301 and is the same as the diameter of the guide hole 4011 formed in the valve 40 or slightly less than the diameter of the guide hole 4011. The length of the protrusion 452 is greater than the depth of the guide hole 4011. The protrusion 452 passes through the first opening 301 and enters the guide hole 4011 of the valve 40. When the tip end 4521 of the protrusion 452 is brought into contact with the bottom surface 4012 of the guide hole 4011, the second opening 431 formed in the bottom surface 4012 is closed by the tip end 4521 of the protrusion 452. That is, in the pressure regulating valve 11 according to the present embodiment, the piston 45, which includes the protrusion 452, configures an example of "one member", and the valve 40, which includes the guide hole 4011, configures an example of "the other member". The tip end 4521 of the protrusion 452 is tapered in the downward direction.

Figure 4:
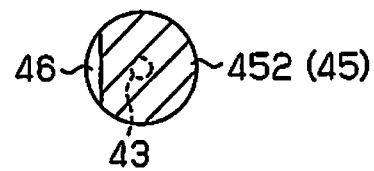
FIG. 4 is a cross-sectional view taken along line 4-4 in FIG. 2.

As shown in FIGS. 2 and 4, a cutout is formed in the side wall of the protrusion 452 of the piston 45 in the upward direction in FIG. 2. This defines a communicating passage 46 between the protrusion 452 and the inner wall of the valve 40. The communicating passage 46 connects the second fluid passage 43 and the pressure regulation chamber 23 with each other.

As shown in FIG. 1, the second body member 22 includes an accommodation chamber 47 defined between the bottom wall of the second body member 22 and the piston 45. That is, the accommodation chamber 47 is located opposite to the valve chamber 25 across the pressure regulation chamber 23, and is separated from the pressure regulation chamber 23 by the piston body 451 of the piston 45. The accommodation chamber 47 is connected with the pressure regulation chamber 23 by an accommodation passage 48 formed in the piston body 451. Accordingly, the fuel pressure in the accommodation chamber 47 is the same as the fuel pressure in the pressure regulation chamber 23.

The upper surface of the substantially columnar piston body 451 faces the accommodation chamber 47. The lower surface of the piston body 451 faces the pressure regulation chamber 23. The diameter of the upper end and the diameter of the lower end of the piston body 451 are the same. Accordingly, the force that pushes the piston 45 downward, i.e., the fuel pressure in the accommodation chamber 47 applied to the upper surface of the piston body 451 is cancelled by the force that pushes the piston 45 upward, i.e., the fuel pressure in the pressure regulation chamber 23 applied to the lower surface of the piston body 451.

The accommodation chamber 47 includes a second spring 49, which serves as a second urging member for applying an urging force to the piston in the direction toward the valve 40, i.e., downward. The urging force that the second spring 49 applies to the piston 45 is less than the urging force that the first spring 41 applies to the valve 40. Accordingly, if any force other than the urging force by the second spring 49 is not applied to the piston 45, the force by which the first spring 41 pushes the valve 40 upward in FIG. 1 is greater than the force by which the piston 45 pushes the valve 40 downward in FIG. 1. Therefore, each of the first opening 301 and the second opening 431 is closed.

An electromagnetic coil 50 is provided about the outer circumference of the tubular portion of the second body member 22, i.e., radially outward of the tubular portion of the second body member 22. When current is supplied from a controller 60 to the electromagnetic coil 50, electromagnetic force is generated. The electromagnetic force moves the piston 45 in the axial direction. For example, when the piston 45 moves downward in FIG. 1, the piston 45 pushes the valve 40 downward in FIG. 1. In this case, if the valve 40 moves downward against the urging force by the first spring 41, the first opening 301 is opened. Accordingly, in the pressure regulating valve 11 according to the present embodiment, the second spring 49 and the electromagnetic coil 50 configure an example of an actuator 51, which adjusts the axial position of the piston 45 when the current is supplied.

A pressure sensor SE is electrically connected to the controller 60. The pressure sensor SE detects fuel pressure upstream from the pressure regulating valve 11, i.e., the fuel pressure between the pressure regulating valve 11 and the tank 12. The controller 60 controls the current supply state based on the fuel pressure (hereinafter, referred to as upstream pressure) detected by the pressure sensor SE and the set pressure in the delivery pipe 13.

For example, when the set pressure is set high, the flow rate of the CNG that flows from the valve chamber 25 into the pressure regulation chamber 23 needs to be increased. Accordingly, the controller 60 selects the first fluid passage 42, which has a cross-sectional area greater than the cross-sectional area of the second fluid passage 43 as a fluid passage. That is, the controller 60 moves the piston 45 downward according to the current supply to the electromagnetic coil 50 to open the first opening 301 in the state where the second opening 431 is maintained closed. At this time, the controller 60 adjusts the opening degree of the first opening 301 to adjust the flow rate of the CNG that flows from the valve chamber 25 through the first fluid passage 42 into the pressure regulation chamber 23.

In contrast, when the set pressure is set low, the flow rate of the CNG that flows from the valve chamber 25 into the pressure regulation chamber 23 needs to be reduced. Accordingly, the controller 60 selects the second fluid passage 43, which has a cross-sectional area less than the cross-sectional area of the first fluid passage 42 as a fluid passage. That is, the controller 60 moves the piston 45 upward according to the current supply to the electromagnetic coil 50 to open the second opening 431 in the state where the first opening 301 is maintained closed. At this time, the controller 60 adjusts the opening degree of the second opening 431 to adjust the amount of the CNG that flows from the valve chamber 25 through the second fluid passage 43 into the pressure regulation chamber 23.

Figure 5:
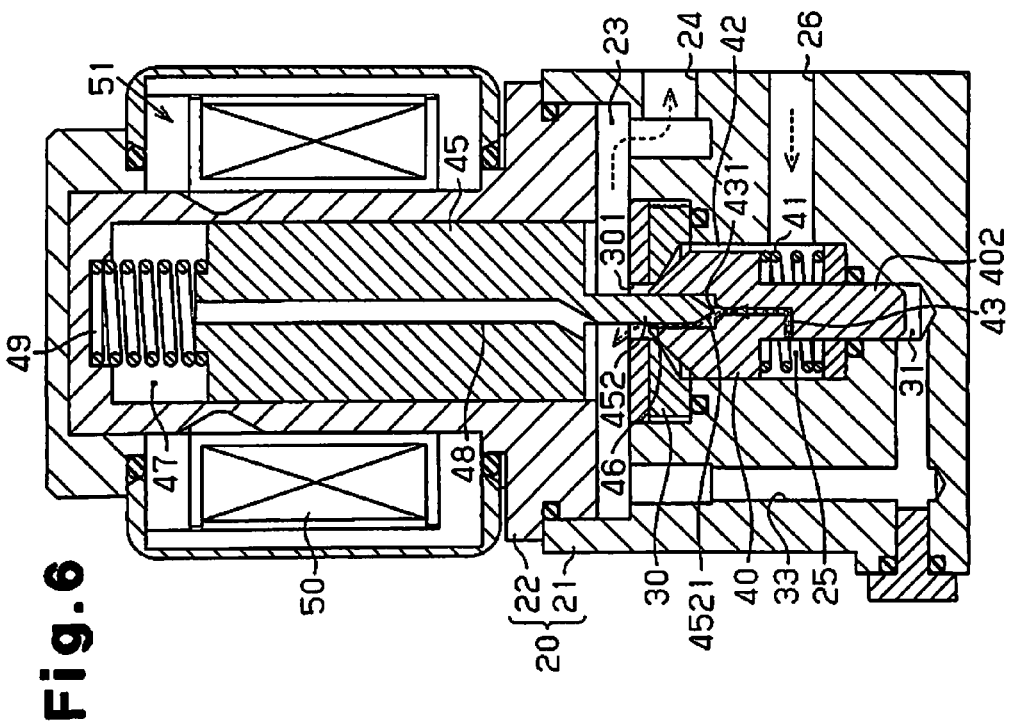
FIG. 5 is a diagram illustrating a state in which a first opening is opened in the pressure regulating valve.
Figure 6:
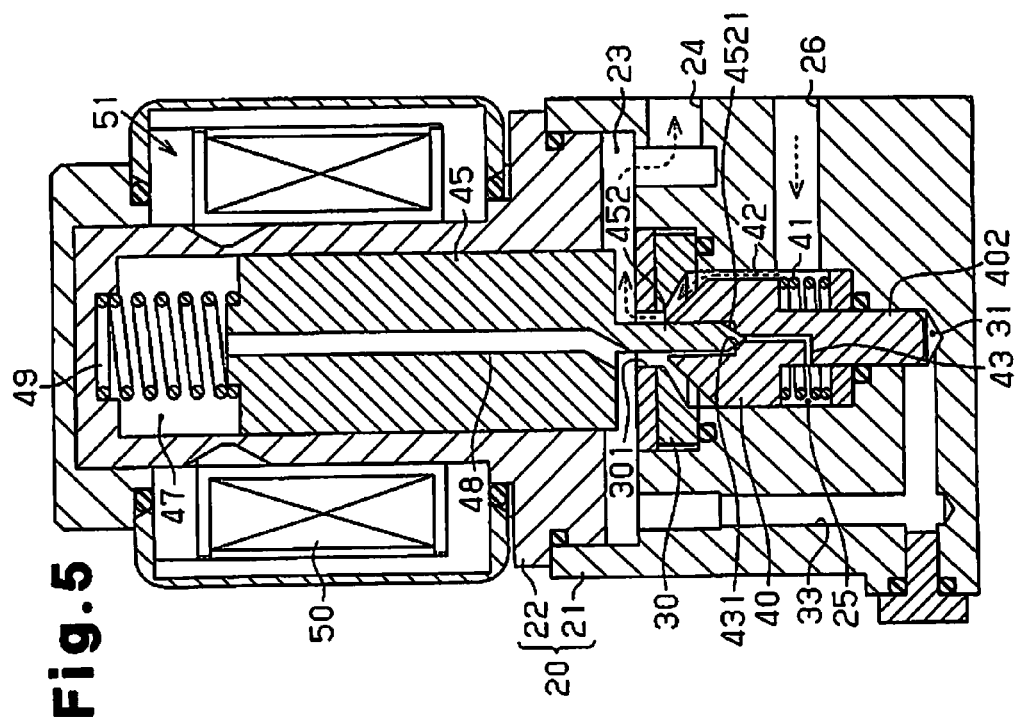
FIG. 6 is a diagram illustrating a state in which a second opening is opened in the pressure regulating valve.

Next, an operation of the pressure regulating valve 11 will be described with reference to FIGS. 5 and 6. When the set pressure in the delivery pipe 13 is high and the first fluid passage 42 is selected as a fluid passage, the current supply state to the electromagnetic coil 50 is adjusted so that the piston 45 moves in the direction toward the valve seat member 30. As shown in FIG. 5, the piston 45 then pushes the valve 40 so that the valve 40 moves against the urging force by the first spring 41 in the direction away from the valve seat member 30. As the valve 40 is separated from the valve seat member 30, the first opening 301 of the valve seat member 30 is opened. Accordingly, the first fluid passage 42 is connected with the pressure regulation chamber 23 via the first opening 301.

The CNG that has flowed through the inflow path 26 into the valve chamber 25 then flows through the first fluid passage 42 and the first opening 301 into the pressure regulation chamber 23. At this time, the opening degree of the first opening 301 is adjusted to adjust the flow rate of the CNG that flows through the first fluid passage 42 into the pressure regulation chamber 23, i.e., the fuel pressure in the pressure regulation chamber 23. The CNG at the thus reduced pressure is discharged from the pressure regulation chamber 23 through the outflow path 24 toward the delivery pipe 13.

When the first fluid passage 42 is selected as described above, the second opening 431 formed in the bottom surface 4012 of the guide hole 4011 of the valve 40 is closed by the tip end 4521 of the protrusion 452 of the piston 45. Accordingly, the inflow of the CNG from the valve chamber 25 through the second fluid passage 43 into the pressure regulation chamber 23 is restricted.

In contrast, when the set pressure in the delivery pipe 13 is low and the second fluid passage 43 is selected as a fluid passage, the current supply state to the electromagnetic coil 50 is adjusted so that the piston 45 moves in the direction away from the valve seat member 30. As shown in FIG. 6, the tip end 4521 of the protrusion 452 of the piston 45 is then separated from the bottom surface 4012 of the guide hole 4011 of the valve 40 so that the second opening 431 is opened. This connects the second fluid passage 43 with the pressure regulation chamber 23.

The CNG that has flowed through the inflow path 26 into the valve chamber 25 then flows through the second fluid passage 43 and the communicating passage 46 into the pressure regulation chamber 23. At this time, the opening degree of the second opening 431 is adjusted to adjust the flow rate of the CNG that flows through the second fluid passage 43 into the pressure regulation chamber 23, i.e., the fuel pressure in the pressure regulation chamber 23. The CNG at the thus reduced pressure is discharged from the pressure regulation chamber 23 through the outflow path 24 toward the delivery pipe 13.

When the second fluid passage 43 is selected as described above, the urging force by the second spring 49 through the piston 45 is not applied to the valve 40. As a result, the valve 40 is seated on the valve seat member 30 by the urging force by the first spring 41 so that the first opening 301 is closed. Accordingly, the inflow of the CNG from the valve chamber 25 through the first fluid passage 42 into the pressure regulation chamber 23 is restricted.

The above described configuration and the operation have the following advantages.

(1) The cross-sectional area of the second fluid passage 43 is less than the cross-sectional area of the first fluid passage 42. Accordingly, when the flow rate of the CNG that flows from the valve chamber 25 into the pressure regulation chamber 23 needs to be reduced such as when the set pressure in the delivery pipe 13 is low, the second fluid passage 43 is selected as a fluid passage. The CNG in the valve chamber 25 flows through the second fluid passage 43 into the pressure regulation chamber 23. When the set pressure is low, the second fluid passage 43 is selected as described above. In this case, in comparison to the case where the first fluid passage 42 is selected, the excessive flow of the CNG from the valve chamber 25 into the pressure regulation chamber 23 is limited. As a result, the fuel pressure in the pressure regulation chamber 23 is adjusted to a fuel pressure in accordance with the set pressure.

In contrast, when the flow rate of the CNG that flows from the valve chamber 25 into the pressure regulation chamber 23 needs to be increased such as when the set pressure in the delivery pipe 13 is high, the first fluid passage 42 is selected as a fluid passage. The CNG in the valve chamber 25 flows through the first fluid passage 42 into the pressure regulation chamber 23. When the set pressure is high, the first fluid passage 42 is selected as described above. In this case, in comparison to the case where the second fluid passage 43 is selected, the CNG easily flows from the valve chamber 25 into the pressure regulation chamber 23. As a result, the occurrence of an event in which the fuel pressure in the pressure regulation chamber 23 is much lower than the set pressure is limited.

As described above, the driving of the actuator is controlled in accordance with the set pressure, and one of the first fluid passage 42 and the second fluid passage 43 is selected as a communication path of the CNG from the valve chamber 25 into the pressure regulation chamber 23. This easily adjusts the fuel pressure in the pressure regulation chamber 23 to a fuel pressure in accordance with the set pressure at the time. Therefore, the variation in the adjustment accuracy of the fuel pressure in the pressure regulation chamber 23 caused by changes of the set pressure in the delivery pipe 13 is limited.

(2) Since the back pressure chamber 31 is connected with the pressure regulation chamber 23 through the back pressure passage 33, the fuel pressure in the back pressure chamber 31 is the same as the fuel pressure in the pressure regulation chamber 23. Accordingly, the force applied to the valve 40 based on the fuel pressure in the pressure regulation chamber 23 is cancelled by the force applied to the valve 40 based on the fuel pressure in the back pressure chamber 31. As a result, when the opening degree of the first opening 301 is adjusted to adjust the fuel pressure in the pressure regulation chamber 23, the opening degree of the first opening 301 is appropriately adjusted regardless of the magnitude of the fuel pressure in the pressure regulation chamber 23 at the time. Accordingly, when the first fluid passage 42 is selected as a communication path, the fuel pressure in the pressure regulation chamber 23 is controlled with high accuracy.

(3) Since the accommodation chamber 47 is connected with the pressure regulation chamber 23 through the accommodation passage 48, the fuel pressure in the accommodation chamber 47 is the same as the fuel pressure in the pressure regulation chamber 23. Accordingly, the force applied to the piston 45 based on the fuel pressure in the pressure regulation chamber 23 is cancelled by the force applied to the piston 45 based on the fuel pressure in the accommodation chamber 47. As a result, when the opening degree of the second opening 431 is adjusted to adjust the fuel pressure in the pressure regulation chamber 23, the opening degree of the second opening 431 is appropriately adjusted regardless of the magnitude of the fuel pressure in the pressure regulation chamber 23 at the time. Accordingly, when the second fluid passage 43 is selected as a communication path, the fuel pressure in the pressure regulation chamber 23 is controlled with high accuracy.

(4) Since the first opening 301 and second opening 431 are coaxially arranged with each other, the radial increase of the size of the pressure regulating valve 11 is limited in comparison to the case where the axial center of the first opening 301 and the axial center of the second opening 431 are offset from each other.

(5) Even if the piston 45 is relatively moved in the direction away from the valve 40, the tip end 4521 of the protrusion 452 of the piston 45 is positioned in the guide hole 4011. Accordingly, when the piston 45 relatively approaches the valve 40, the tip end 4521 of the protrusion 452 is appropriately guided to the bottom surface 4012 along the side wall of the guide hole 4011. Therefore, the tip end 4521 of the protrusion 452 is appropriately brought into contact with the bottom surface 4012 of the guide hole 4011 so that the second opening 431 is closed by the protrusion 452.

(6) The piston 45 is urged by the second spring 49 in the direction toward the valve 40. Accordingly, when the current is not supplied to the electromagnetic coil 50, the tip end 4521 of the protrusion 452 of the piston 45 is brought into contact with the bottom surface 4012 of the guide hole 4011 of the valve 40 according to the urging force by the second spring 49. That is, the second opening 431 is closed by the protrusion 452 of the piston 45.

Further, the electromagnetic force generated based on the current supply to the electromagnetic coil 50 moves the piston 45 in the direction away from the valve 40 against the urging force by the second spring 49. This opens the second opening 431. Moreover, at this time, the value of the current that flows through the electromagnetic coil 50 is adjusted to adjust the axial position of the protrusion 452. This appropriately adjusts the opening degree of the second opening 431.

(7) The urging force by the second spring 49 is less than the urging force by the first spring 41. Therefore, when the current is not supplied to the electromagnetic coil 50, the first opening 301 is closed as well as the second opening 431.

If the sufficient airtightness of the thus closed second opening 431 and the sufficient airtightness of the thus closed first opening 301 are ensured, a shut off valve that permits or shuts off the supply of the CNG into the delivery pipe 13 needs not be provided in the supply system of the CNG. This contributes to the reduction of the number of parts in the supply system of the CNG. However, if the above airtightness is not sufficient, it is preferable that the shut off valve be provided in the supply system.

The above described embodiment may be modified as follows.

The urging force by the second spring 49 may be the same as or greater than the urging force by the first spring 41.

If the piston moves in the axial direction by the electromagnetic force generated by the current supply to the electromagnetic coil 50, the piston needs not be entirely formed of magnetic material. That is, a piston that is partly is formed of magnetic material may be employed. For example, the piston may be configured such that the piston body 451 is formed of magnetic material and the protrusion 452 is formed of any material other than the magnetic material.

Actuators with any configuration other than the configuration of the above actuator 51 may be employed as long as the axial position of the piston 45 can be adjusted. For example, the actuator may be a direct driven motor, or may include a rotating motor and a conversion mechanism that converts the rotating force supplied from the motor into a straight moving force.

The guide hole 4011 of the valve 40 may be omitted. In this case, as shown in FIG. 7, the second fluid passage 43 extends toward the upper end of the valve 40 in FIG. 7 to form the second opening 431 in the upper end of the valve 40. In such a configuration, the tip end of the protrusion 452 of the piston 45 is brought into contact with the upper end of the valve 40. This closes the second opening 431.

As shown in FIG. 8, the protrusion needs not be provided on the piston 45. In this case, the valve 40 may include a protrusion 403, which extends through the first opening 301 toward the piston 45. In this case, the second fluid passage 43 extends toward the tip end of the protrusion 403 of the valve 40, and the second opening 431 is formed in the tip end surface, i.e., the upper surface of the valve 40 in FIG. 8. In such a configuration, the tip end of the protrusion 403 of the the valve 40 is brought into contact with the piston 45, i.e., the lower end of the piston body 451 in FIG. 8. This closes the second opening 431.

Further, when the protrusion 403 is provided on the valve 40 as described above, a guide hole through which the protrusion 403 passes may be formed in the piston 45. In this case, the valve 40 configures an example of "one member" and the piston 45 configures an example of "the other member".

Further, when the protrusion 403 is provided on the valve 40 as described above, the accommodation passage 48 may be provided at a position shifted from the axial center of the piston body 451. Moreover, a groove that extends in the axial direction may be formed in the circumferential wall of the piston body 451, and the accommodation passage 48 may be provided between the groove and the inner circumferential wall of the second body member 22.

Figure 9:
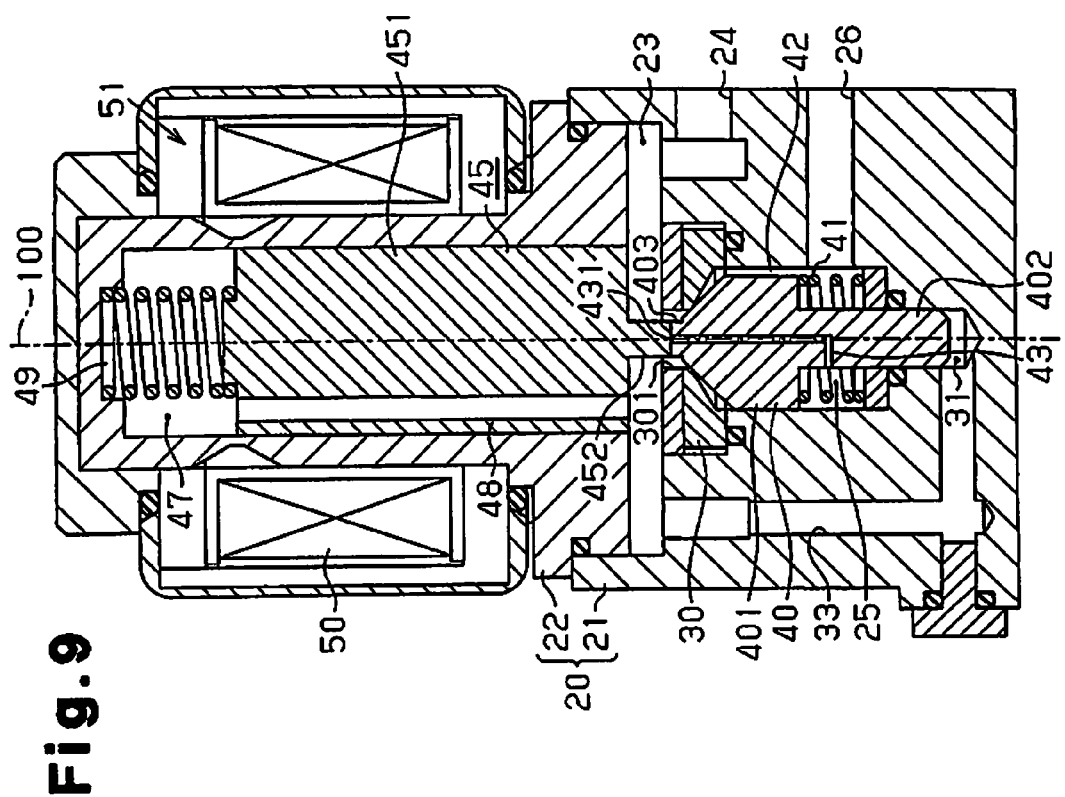
FIG. 9 is a cross-sectional view schematically illustrating the configuration of a pressure regulating valve according to yet another embodiment.

As shown in FIG. 9, the protrusions 403 and 452 may be provided on the corresponding valve 40 and the piston 45. That is, the first protrusion 403, which protrudes toward the piston 45, may be provided on the valve 40, and the second protrusion 452, which protrudes toward the valve 40, may be provided on the piston 45. It is preferable that the tip ends of the first and second protrusions 403 and 452 be arranged in the first opening 301.

The first protrusion 403 needs not pass through the first opening 301 into the pressure regulation chamber 23 as long as the first protrusion 403 protrudes in the first opening 301. The second protrusion 452 needs not pass through the first opening 301 into the valve chamber 25 as long as the second protrusion 452 protrudes in the first opening 301 in the same manner.

In the case where the protrusions 403 and 452 are provided on the corresponding valve 40 and the piston 45 as described above, as the tip end of the first protrusion 403 of the valve 40 contacts the tip end of the second protrusion 452 of the piston 45, the second opening 431 is closed.

The axial center of the second opening 431 may be offset from the axial center of the first opening 301. In this case, although the size of the pressure regulating valve 11 may be more or less radially increased, the piston 45 may be arranged such that the axial center of the piston 45 is offset from the axial center of the valve 40.

The first fluid passage 42 may be provided at any position other than the position between the valve 40 and the inner wall of the first body member 21 as long as the first fluid passage 42 is in communication with the pressure regulation chamber 23 through the first opening 301 when the valve 40 is separated from the valve seat member 30. For example, the first fluid passage 42 may be provided in the valve 40 as well as the second fluid passage 43.

The cross-sectional area of the first fluid passage 42 may be less than the cross-sectional area of the second fluid passage 43. In this case, when the set pressure is low, it is preferable that the CNG in the valve chamber 25 flow through the first fluid passage 42 into the pressure regulation chamber 23. In contrast, when the set pressure is high, it is preferable that the CNG in the valve chamber 25 flow through the second fluid passage 43 into the pressure regulation chamber 23.

It may be determined whether the first fluid passage 42 or the second fluid passage 43 is selected based on any parameters other than the magnitude of the set pressure in the delivery pipe 13. For example, either the first fluid passage 42 or the second fluid passage 43 may be selected based on the upstream pressure detected by the pressure sensor SE, i.e., the fuel pressure upstream from the pressure regulating valve 11.

In this case, the greater the upstream pressure detected by the pressure sensor SE is, the greater the fuel pressure in the valve chamber 25 is. Accordingly, a large amount of CNG easily flows from the valve chamber 25 into the pressure regulation chamber 23. Accordingly, the second fluid passage 43 with a cross-sectional area less than the cross-sectional area of the first fluid passage 42 may be selected as a fluid passage to control the fuel pressure in the pressure regulation chamber 23 with high accuracy. In this case, in comparison to the case where the CNG flows from the valve chamber 25 through the first fluid passage 42 into the pressure regulation chamber 23, a large amount of CNG is unlikely to flow into the pressure regulation chamber 23 so that the occurrence of the event where the fuel pressure in the pressure regulation chamber 23 is excessively increased is avoided.

In contrast, the lower the upstream pressure detected by the pressure sensor SE is, the lower the fuel pressure in the valve chamber 25 is. Accordingly, the CNG is unlikely to flow from the valve chamber 25 into the pressure regulation chamber 23. Accordingly, the first fluid passage 42 with a cross-sectional area greater than the cross-sectional area of the second fluid passage 43 may be selected as a fluid passage to reduce the amount of difference between the fuel pressure in the pressure regulation chamber 23 and the set pressure in the delivery pipe 13. In this case, in comparison to the case where the CNG flows from the valve chamber 25 through the second fluid passage 43 into the pressure regulation chamber 23, the CNG easily flows into the pressure regulation chamber 23 so that the fuel pressure in the pressure regulation chamber 23 is close to the set pressure in the delivery pipe 13.

Accordingly, the first fluid passage 42 and the second fluid passage 43 are appropriately selected to be used based on the magnitude of the fuel pressure upstream from the pressure regulating valve 11. This limits the variation in the adjustment accuracy of the fuel pressure in the pressure regulation chamber 23 due to the magnitude of the fuel pressure upstream from the pressure regulating valve 11.

The selection between the first fluid passage 42 and the second fluid passage 43 may be made with reference to the set pressure in the delivery pipe 13 as well as the upstream pressure detected by the pressure sensor SE.

In the above embodiment, the pressure regulating valve that reduces the pressure of the CNG supplied to the internal combustion engine is embodied. A pressure regulating valve that reduces the pressure of any gases other than the CNG or liquid such as oil may be embodied.

Therefore, the present examples and embodiments are to be considered as illustrative and not restrictive and the invention is not to be limited to the details given herein, but may be modified within the scope and equivalence of the appended claims.

The invention claimed is:
1. A pressure regulating valve, comprising:
a device body including
an inflow portion into which fluid flows;
a valve chamber that is in communication with the inflow portion;
an outflow portion out of which the fluid flows;
a pressure regulation chamber that is in communication with the outflow portion;

a valve seat member, which separates the valve chamber and the pressure regulation chamber from each other;
a valve located in the valve chamber, wherein the valve is capable of closing a first opening of the valve seat member;
an urging member, which applies an urging force to the valve in a direction toward the valve seat member;
a piston arranged opposite to the valve across the valve seat member;
an actuator, which adjusts a position of the piston in accordance with a power supply state;
a first fluid passage, which draws the fluid in the valve chamber into the pressure regulation chamber, wherein the first fluid passage is connected with the pressure regulation chamber via the first opening in a state where the valve is separated from the valve seat member;
a second fluid passage provided in the valve, wherein the second fluid passage includes
a second opening, has a cross-sectional area that is different from
a cross-sectional area of the first fluid passage and draws the fluid in the valve chamber into the pressure regulation chamber; and
a protrusion, which is provided on at least one of the piston and the valve, wherein in a case where the protrusion is provided on the piston, the protrusion protrudes toward the valve through the first opening, and when a tip end of the protrusion comes into contact with the valve, the second opening of the second fluid passage is closed, in a case where the protrusion is provided on the valve, the protrusion protrudes toward the piston through the first opening, and when the tip end of the protrusion comes into contact with the piston, the second opening of the second fluid passage is closed, in a case where the protrusion is provided on each of the piston and the valve, the protrusion on the piston protrudes toward the valve through the first opening, the protrusion on the valve protrudes toward the piston through the first opening, and when the tip end of the protrusion on the valve comes into contact with the tip end of the protrusion on the piston, the second opening of the second fluid passage is closed, and when the tip end of the protrusion is out of contact with any of the piston and the valve and the second opening is opened, the second fluid passage is in communication with the pressure regulation chamber, wherein the urging member is a first urging member, wherein at least a part of the piston is formed from a magnetic material, the actuator includes an electromagnetic coil arranged radially outward of the piston, a second urging member arranged in an accommodation chamber opposite to the valve chamber across the pressure regulation chamber, wherein the second urging member applies an urging force to a wall of the pressure regulation chamber and the second urging member applies an urging force to the piston in a direction toward the valve, and wherein the urging force by the second urging member is less than the urging force by the first urging member.

2. The pressure regulating valve according to claim 1, wherein the device body includes at back pressure chamber located opposite to the pressure regulation chamber across the valve chamber, a communicating portion, which connects the valve chamber and the back pressure chamber with each other, and a back pressure passage, which connects the back pressure chamber and the pressure regulation chamber with each other, and wherein the valve includes a body positioned in the valve chamber, and a cancelling portion, which extends from the body into the communicating portion and separates the valve chamber and the back pressure chamber from each other.

3. The pressure regulating valve according to claim 1, wherein the device body includes an accommodation chamber located opposite to the valve chamber across the pressure regulation chamber, and an accommodation passage, which connects the accommodation chamber and the pressure regulation chamber with each other, and wherein the accommodation chamber is separated from the pressure regulation chamber by the piston.

4. The pressure regulating valve according to claim 1, wherein the first opening and the second opening are coaxially arranged with each other.

5. The pressure regulating valve according to claim 1, wherein the protrusion is provided on one member of the piston and the valve, and a guide hole, into which the protrusion advances, is formed in the other member of the piston and the valve, the second opening is closed when the tip end of the protrusion comes into contact with a bottom surface of the guide hole, and the tip end of the protrusion is located in the guide hole even if the piston is relatively away from the valve.

* * * * *